Feb. 14, 1950  A. KATZOW  2,497,819
REFRIGERATING SYSTEM
Filed Jan. 29, 1944  2 Sheets-Sheet 2

INVENTOR.
Abram Katzow

Patented Feb. 14, 1950

2,497,819

UNITED STATES PATENT OFFICE 2,497,819

REFRIGERATING SYSTEM

Abram Katzow, Indianapolis, Ind.

Application January 29, 1944, Serial No. 520,268

11 Claims. (Cl. 62—119.5)

This invention relates to the art of refrigerating wherein a part of refrigerant used in the system passes absorbed in a solvent from an absorber to an evaporator where the solvent enters into a union with a medium whereby the refrigerant is freed from the solvent in presence of an inert gas while producing refrigeration. From the evaporator the refrigerant in gaseous form mixed with inert gas passes to the absorber where the refrigerant is absorbed into solvent liberating the inert gas. Another part of refrigerant used in this system is also evaporated in the evaporator in presence of inert gas while producing refrigeration. From the evaporator this refrigerant mixed with inert gas passes to the absorber where the refrigerant is absorbed into solvent liberating the inert gas. From the absorber the last mentioned solution of refrigerant and solvent passes to a generator where the refrigerant is expelled by means of heat from the solution, condensed in a condenser and evaporated in the evaporator in presence of inert gas while producing refrigeration.

More particularly this invention relates to a refrigerating system in which only that part of refrigerant used in the system which passes from the generator to the condenser (expelled from solution of refrigerant and absorbent) is dependent solely upon application of heat.

Further objects, advantages, features and mode of operation will be apparent from the following description with reference to the accompanying drawings of which:

Figure 1:
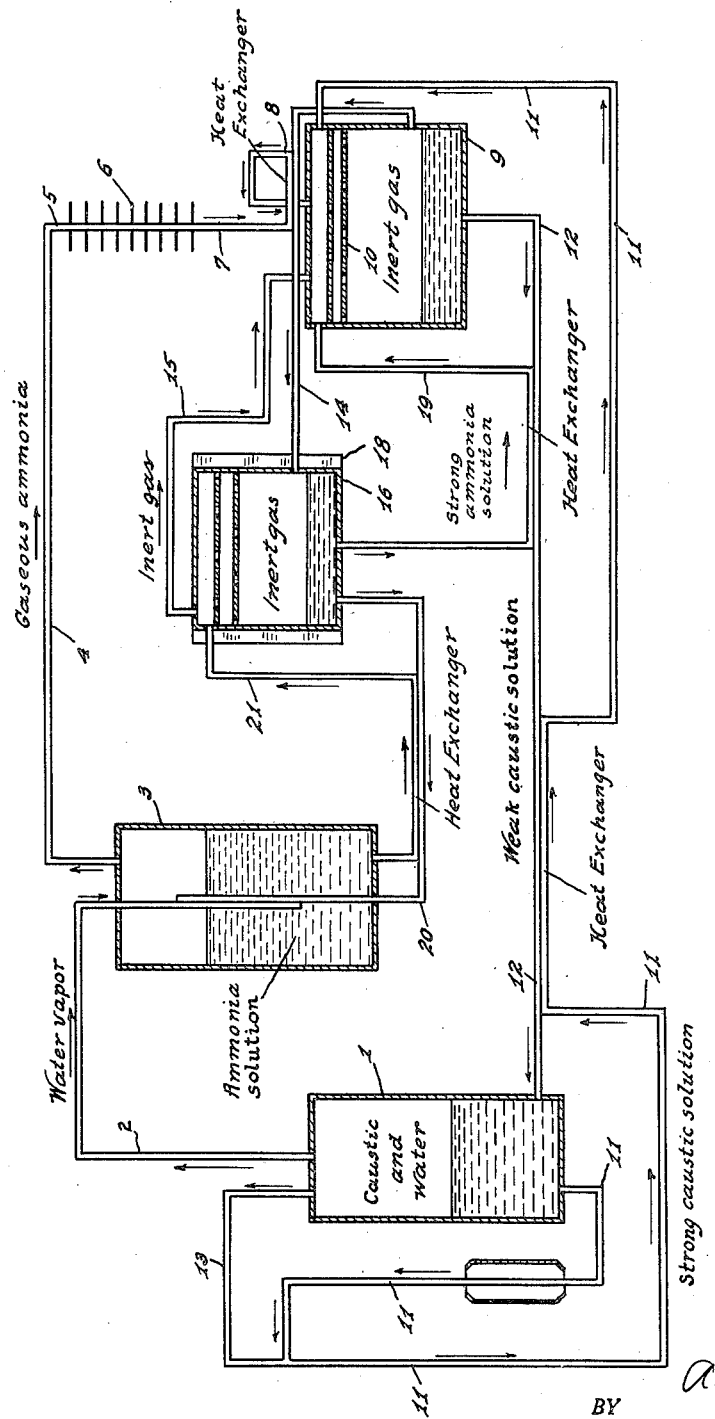
Fig. 1 shows one form of the present invention.

In Fig. 1, I designates a boiler which contains a volatilizable solvent, for instance water, dissolved in a suitable substance such as caustic. It should be distinctly understood that other suitable substances may be used and that water and caustic solution is used for illustration only. The boiler may be heated by any suitable means. The boiler I is connected to a generator 3 by means of a conduit 2, and while one end of the conduit 2 is connected to the upper part of the boiler I the other end of the conduit is arranged in a liquid in the generator 3. The generator 3 contains a cooling agent, for instance ammonia, dissolved in a solvent, such as water. It should be distinctly understood that the solution of ammonia and water is used for illustration only, and that other substances may be used. Condenser 5 is connected to the generator 3 and evaporator 9 by means of conduits 4 and 7 respectively. The condenser 5 is cooled by means of air into which heat radiating fins 6 extend, however other means for cooling the condenser may be used. In conduit 7 there is a liquid seal 8 which is intended to prevent passage of gas therethrough from the evaporator. Perforated plates 10 arranged within the evaporator 9. The lower part of the boiler I is connected to the upper part of the evaporator 9 by means of a conduit II. The liquid which enters the conduit II from the boiler is heated in a part of the conduit II wherein the liquid is lifted to a higher level from where the liquid gravitates into the evaporator 9. At one place the conduit II is connected to the upper part of the boiler I by means of a conduit 13 through which vapor developed in the conduit II passes into the boiler I. Lower part of the evaporator 9 is connected to the lower part of the boiler I by means of a conduit 12. The evaporator 9 is connected to an absorber 16 by means of conduits 14 and 15. Part of conduits 7 and 14, and part of conduits 14 and 15 form temperature exchangers. Perforated plates 17 are arranged within the absorber 16. The absorber is cooled by means of air into which heat radiating fins 18 extend. Other means for cooling the absorber may be used. The lower part of the absorber 16 is connected to the evaporator 9 by means of a conduit 19, through which a strong solution of cooling agent and solvent passes to the evaporator. Part of conduit II and that of 12 form a temperature exchanger. Part of conduit 12 and that of 19 form a temperature exchanger. Lower part of the absorber 16 is also connected to the generator 3 by means of a conduit 20. Part of conduit 20 and that part of conduit 2 which is in the generator 3 are arranged so that when heat is given off from the conduit 2 it is transmitted to the liquid in the conduit 20 causing vapor to develop therein which raises the liquid to a higher level in the generator 3, than that in the absorber 16. The lower part of the generator 3 and the upper part of the absorber 16 are connected by means of a conduit 21 through which liquid passes from the generator 3 to the absorber 16. Part of conduits 20 and 21 are arranged to form a temperature exchanger. The evaporator 9, the absorber 16 and the conduits 14 and 15 contain an inert gas, such as air, to balance pressures between that of the boiler on one hand and evaporator on the other.

The system operates as follows: Heat is applied to the boiler I whereupon water vapor is expelled from the solution of caustic and water. From the boiler I water vapor passes into the conduit 2. The liquid which is in the conduit 2 provides a foothold for the vapor to balance pressures between that of gases in the evaporator 9 (or the column of liquid and gases in the evaporator 9) and that of ammonia in the generator 3. From the boiler I strong caustic solution enters the conduit II where it is heated, vapor developed in the conduit II lifts the caustic solution to a higher level from where the strong caustic solution gravitates into the upper part of the evaporator 9, while the vapor developed in the conduit II passes from the conduit II through the conduit 13 into the boiler I. The evaporator 9 is also supplied with a strong solution of ammonia and water which enters the evaporator 9 through the conduit 19 from the absorber 16 and with liquid ammonia containing some water through the conduit 7 from the condenser 5. The liquid ammonia, the caustic solution and the solution of ammonia in water are spread over the perforated plates 10, and since ammonia is less soluble in caustic than water, it evaporates off in presence of the inert gas, producing refrigeration, while water enters into solution with caustic. The caustic solution containing water extracted from the ammonia in the evaporator, passes from the evaporator 9 through the conduit 12 into the boiler 1 where the water and some carried over ammonia is boiled off, passing into the conduit 2. In that part of the conduit 2 which is arranged in the generator 3 the vapor condenses and as hot liquid enters the generator 3. When the total pressure of gases in the evaporator is relatively low the space occupied by vapor in the conduit 2 is decreased and a column of condensed liquid in the conduit 2 is at a higher level, on the other hand when the pressure in the evaporator is relatively high the space occupied by vapor is increased and the column of liquid is at a lower level. When the highest desired pressure in the system is reached, the conduit 2 will contain no liquid and the vapor instead of condensing in the conduit 2 will pass into the generator 3. In condensing vapor gives up heat which is transmitted to the liquid in the conduit 20 and to the solution in the generator 3 expelling ammonia from the solution of ammonia and water. From the generator 3 ammonia vapor passes through the conduit 4 into the condenser 5 where due to cooling ammonia vapor is liquefied. From the condenser 5 liquid ammonia passes through the conduit 7 into the evaporator 9 where in presence of inert gas, ammonia evaporates producing refrigeration. Should there be any change in temperature at which the refrigerant condenses, or should there be any other change affecting the total pressure throughout the system the liquid in the evaporator provides for the variation of volume and hence pressure of the inert gas whenever a change occurs. Specifically should the temperature at which the refrigerant condenses in the condenser 5 fall thus working a decrease in the total pressure existing throughout the system the volume of the space occupied by the inert gas is increased by withdrawing of liquid from the evaporator 9 through the conduit 12, thereby reducing the partial pressure of the inert gas. Similarly, if the temperature of the condenser is increased thus increasing the total pressure throughout the system, the volume of the space occupied by the inert gas is decreased by bringing in liquid into the evaporator thereby increasing the partial pressure of the inert gas. Ammonia evaporated in the evaporator 9 mixed with inert gas passes through the conduit 14 into the absorber 16, where the mixture comes into contact with weak absorption liquid supplied thereto from the generator 3 through the conduit 21 whereby ammonia is absorbed into the weak solution of ammonia and water, while the inert gas is liberated. Heat given off in absorption is transmitted to the atmospheric air by means of heat radiating fins 18. The inert gas so liberated passes from the absorber 16 through the conduit 15 into the evaporator 9. A part of the ammonia and water solution from the absorber 16 passes through the conduit 19 into the evaporator 9 where by coming in contact with caustic, in presence of inert gas, ammonia evaporates off, producing refrigeration, while another part of the ammonia and water solution is carried from the absorber 16 through the conduit 20 into the generator 3, due to influence of heat applied to the conduit 20. In the generator 3 ammonia is expelled from the solution, passing through the conduit 4 into the condenser 5.

Figure 2:
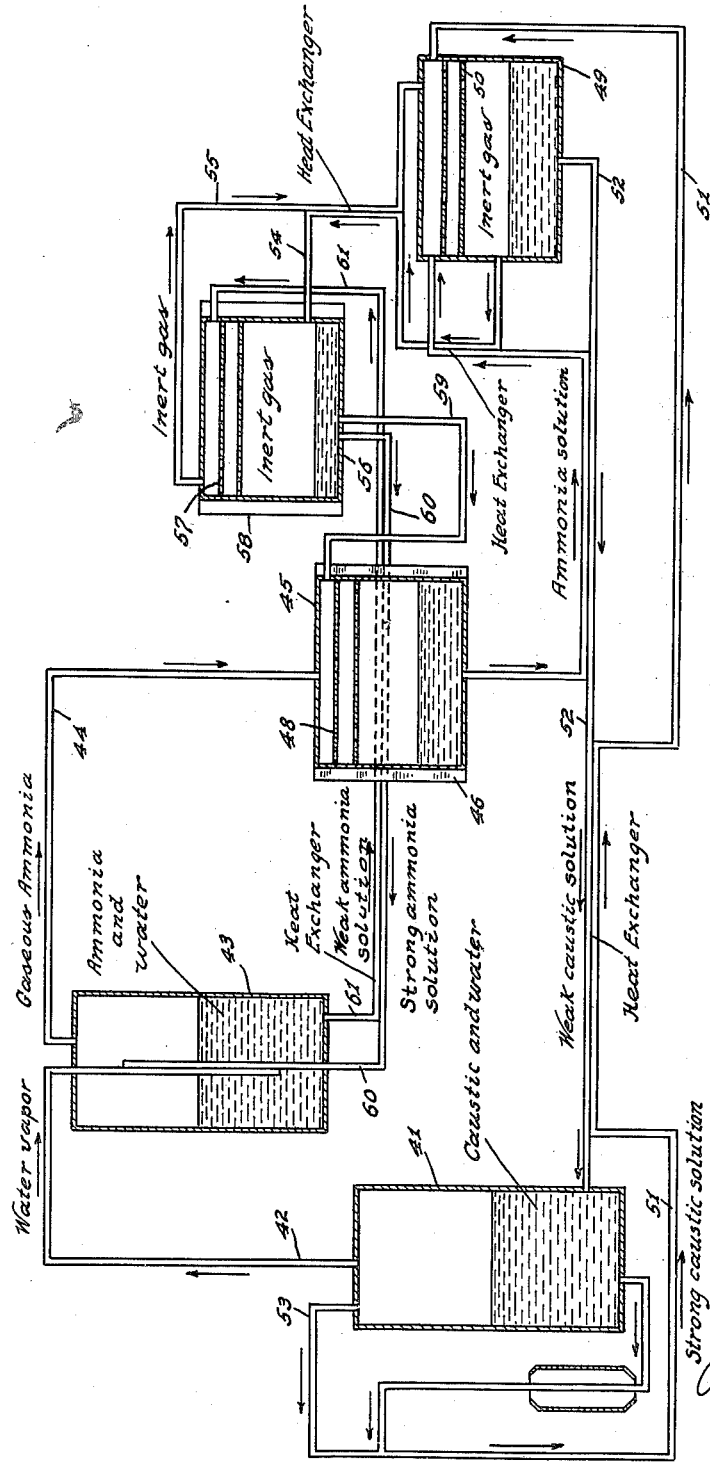
Fig. 2 shows a modification.

With reference to the modification shown in Fig. 2 it will be seen that this modification differs from what is shown in Fig. 1 particularly in that the refrigerant expelled from a solution of refrigerant and absorbent enriches already a strong solution, and then the enriched solution is brought into contact with a substance, such as caustic, whereby the water from the water and ammonia solution enters into solution with caustic liberating ammonia while it produces refrigeration.

In the apparatus shown in Fig. 2, 41 designates a boiler which contains a volatilizable solvent, for instance water, dissolved in a suitable solvent such as caustic. It should be distinctly understood that other suitable substances may be used and that water and caustic solution is used for illustration only. The boiler 41 may be heated by any suitable means. The boiler 41 is connected to a generator 43 by means of a conduit 42, and while one end of the conduit 42 is connected to the boiler 41 the other end is arranged in the liquid in the generator 43. The generator 43 contains a cooling agent, for instance ammonia, dissolved in water. It should be understood that ammonia and water are used for illustration only, and that other suitable substances may be used. Absorber 45 is connected to the generator by means of a conduit 44. Perforated plates 48 arranged within the absorber 45. Absorber 45 is cooled by means of cooling air into which heat radiating fins 46 extend. Absorber 45 is connected to an evaporator 49 by means of a conduit 47. Perforated plates 50 arranged within the evaporator 49. The lower part of the boiler 41 is connected to the upper part of the evaporator 49 by means of a conduit 51. The liquid which enters the conduit 51 from the boiler 41 is heated in a part of the conduit wherein the liquid is lifted to a higher level from where the liquid gravitates into the evaporator 49. One part of the conduit 51 is connected to the upper part of the boiler 41 by means of a conduit 53 through which vapor developed in the conduit 51 passes into the boiler 41. The lower part of the evaporator 49 is connected to the lower part of the boiler 41 by means of a conduit 52. Part of conduit 51 and part of conduit 52 are arranged to form a temperature exchanger. Part of conduit 47 and part of conduit 52 are arranged to form a temperature exchanger. The evaporator 49 is connected to an absorber 56 by means of conduits 54 and 55. Part of conduit 47 and part of conduit 54 are arranged to form a temperature exchanger. Part of conduit 54 and part of conduit 55 form a temperature exchanger. Perforated plates 57 are arranged within the absorber 56. The absorber 56 is cooled by means of air into which heat radiating fins extend. Other means for cooling the absorbers 45 and 56 may be used. The lower part of the absorber 56 is connected to the upper part of the absorber 45 by means of a conduit 59. The lower part of the absorber 56 is connected to the generator 43 by means of a conduit 60. The lower part of the generator 43 is connected to the upper part of the absorber 56 by means of a conduit 61. Part of conduit 60 and that part of conduit 42 which is arranged in the generator 43 form a temperature exchanger. Part of conduits 60 and 61 arranged to form a temperature exchanger. The evaporator 49, the absorber 56 and the conduits 54 and 55 contain an inert gas, such as air, in presence of which ammonia evaporates from the solution in the evaporator 49 and is absorbed into a solution in the absorber 56.

The mode of operation is as follows: Heat is applied to the boiler 41 whereupon water vapor is expelled from the solution of caustic and water. From the boiler 41 water vapor passes into the conduit 42 where liquid contained in the conduit 42 provides a foothold for the vapor to balance pressures between that of liquid and gases in the evaporator 49 and that of ammonia in the generator 43. From the boiler 41 strong caustic solution enters the conduit 51 where it is heated, vapor developed in the conduit 51 lifts the caustic solution to a higher level from where the strong caustic solution gravitates into the upper part of the evaporator 49 while the vapor from the conduit 51 passes through the conduit 53 into the boiler 41. The evaporator 49 is also supplied with a solution of ammonia and water which enters the evaporator 49 through the conduit 47 from the absorber 45. The caustic solution and the solution of ammonia and water entering the evaporator 49 are spread over the perforated plates 50. Since ammonia is less soluble in caustic than water, thus while the water enters into solution with caustic, ammonia in presence of inert gas evaporates off from the water, producing refrigeration. The caustic and water solution passes through the conduit 52 into the boiler 41 where the water is boiled off. In the conduit 42 the water vapor while maintaining pressure condenses and in form of liquid enters the generator 43. When the pressure in the system is decreased the space occupied by water vapor in the conduit 42 is decreased and the column of liquid in the conduit is at a higher level, on the other hand when the pressure of the system is increased the space occupied by vapor is increased and the column of liquid in the conduit is at a lower level. When the highest desired pressure in the system is reached the conduit 42 will contain no liquid and the vapor passing into the generator will condense in the generator 43. If condensation takes place in the conduit 42 heat given off is transmitted to the solution in the generator 43 expelling ammonia from the solution of ammonia and water. From the generator 43 ammonia passes through the conduit 44 into the absorber 45 where ammonia enriches an already rich with ammonia solution. From the absorber 45 the solution passes through the conduit 47 into the evaporator 49 where in presence of inert gas, water enters into solution with caustic, and ammonia evaporates producing refrigeration. Should there be any change in the temperature at which the refrigerant is absorbed in the absorber 45, or should there be any other change affecting the total pressure throughout the system the body of liquid in the evaporator 49 provides for the variation of volume and hence pressure of inert gas whenever a change occurs. Specifically should the temperature at which the refrigerant is absorbed into solution in the absorber 45 be reduced thus working a decrease in the total pressure existing throughout the system the volume of the space occupied by the neutral gas is increased by withdrawing of liquid from the evaporator 49 through the conduit 52, thereby reducing the partial pressure of the inert gas. Similarly, if the temperature of the absorber 45 is increased thus increasing the total pressure throughout the system the volume of the space occupied by the inert gas is decreased by bringing in liquid into the evaporator thereby increasing the partial pressure of the inert gas. Ammonia evaporated in the evaporator 49 mixed with inert gas passes through the conduit 54 into the absorber 56, where the mixture comes into contact with weak absorption liquid supplied thereto from the generator 43 through the conduit 61 whereby ammonia is absorbed into the weak solution of ammonia and water and the inert gas is liberated. Heat given off in absorption is transmitted to the atmospheric air by means of heat radiating fins 58. The gas so liberated passes through the conduit 55 into the evaporator 49. A part of strong solution from the absorber 56 passes through the conduit 59 into the absorber 45 where it absorbs ammonia gas which enters the absorber 45 from the generator 43. From the absorber 45 the enriched solution passes through the conduit 47 into the evaporator 49 where by coming in contact with caustic, in presence of inert gas, water enters into solution with caustic and ammonia evaporates off producing refrigeration. Another part of strong solution from the absorber 56 is carried through the conduit 60 due to influence of heat applied to the conduit 60, into the generator 43, where ammonia is expelled from the solution.

It will have been noticed from the above description that the circulation of refrigerant is caused in plurality of circuits, as has been explained with reference to Fig. 1 and Fig. 2. In Fig. 1 the circulation is between the absorber and the evaporator, and between the evaporator absorber generator and condenser. In Fig. 2 the circulation is between the evaporator and the absorbers, and between the evaporator absorbers and the generator.

Having described my invention, what I claim is:

1. In a refrigeration process, the steps of expelling cooling agent from a part of a solution of cooling agent and solvent, condensing the expelled cooling agent and evaporating the cooling agent to produce refrigeration, bringing another part of said solution of cooling agent and solvent into an intimate contact with a medium which while entering into solution with the solvent frees the cooling agent to evaporate from the solvent to produce refrigeration, and reintroducing into the solvent both the expelled and the freed cooling agent.

2. In a refrigeration process, the steps of absorbing a cooling agent into a solvent, expelling cooling agent from a part of said solution of cooling agent and solvent, and absorbing the expelled cooling agent into another part of said solution of cooling agent and solvent, bringing the last mentioned part of said solution with the cooling agent into an intimate contact with a medium which while entering into solution with the solvent frees the cooling agent to evaporate from the solvent to produce refrigeration.

3. In a refrigerating process which includes the steps of absorbing a refrigerant into solvent under a pressure subject to variation, bringing the solution into presence of an inert gas and a medium which enters into solution with the solvent freeing the refrigerant to evaporate from the solvent into said inert gas to produce refrigeration, the additional step of varying the partial pressure of the inert gas in the same sense as the pressure of absorption varies.

4. In a refrigerating process which includes the steps of absorbing a refrigerant into solvent under a pressure subject to variation, bringing the solution into presence of an inert gas and a medium which enters into solution with the solvent freeing the refrigerant to evaporate from the solvent into said inert gas to produce refrigeration, the additional step of varying the volume of the inert gas in the opposite sense to that in which the pressure of absorption varies.

5. That method in producing refrigeration which includes absorbing a cooling agent into a solvent under a pressure subject to variation, expelling cooling agent from a part of said solution of cooling agent and solvent, condensing the expelled cooling agent and evaporating the condensed cooling agent in presence of inert gas to produce refrigeration, bringing another part of said solution into the presence of said inert gas and into an intimate contact with a medium which enters into solution with the solvent and frees the cooling agent to evaporate from the solvent into said inert gas to producing refrigeration, expelling the solvent from the solution of solvent and the medium, with the aid of the expelled solvent varying the partial pressure of said inert gas with the aid of the same solvent and expelling cooling agent from the first mentioned part of said solution.

6. That method in the art of refrigerating which includes absorbing a cooling agent into a solvent under a pressure subject to variation, expelling cooling agent from a part of said solution of cooling agent and solvent and absorbing the expelled cooling agent into another part of said solution of cooling agent and solvent, bringing the last mentioned part of said solution with the cooling agent it contains into the presence of said inert gas and into an intimate contact with a medium which while entering into solution with the solvent frees the cooling agent to evaporate into said inert gas to produce refrigeration, expelling the solvent from the solution of solvent and medium, with the aid of expelled solvent varying the partial pressure of said inert gas and with the aid of the same solvent expelling cooling agent from the first mentioned part of said solution.

7. In refrigeration apparatus having a generator, an evaporator and an absorber, a quantity of neutral gas in said evaporator and absorber, a quantity of liquid in said evaporator, and means for varying the partial pressure of said neutral gas and for varying the quantity of liquid in said evaporator, said means including a conduit connected to said generator and also to said evaporator near the bottom thereof for transferring liquid between the evaporator and the generator 8. Refrigerating apparatus of absorption type including a boiler, a generator, a condenser, an absorber, an evaporator, means for conducting a solvent from the boiler to the generator, means for conducting solvent from the generator to the absorber, means for conducting vapor refrigerant from the generator to the condenser, means for conducting liquid refrigerant from the condenser to the evaporator, means for conducting gaseous refrigerant mixed with a neutral gas from the evaporator to the absorber, means for conducting a strong solution of refrigerant and solvent from the absorber to the evaporator and means for conducting a strong solution of refrigerant and solvent from the absorber to the generator, means for conducting neutral gas from the absorber to the evaporator, means for conducting from the boiler to the evaporator a medium in which the solvent is soluble but the refrigerant is relatively non-soluble, and means for conducting solvent dissolved in the medium from the evaporator to the boiler.

9. Refrigerating apparatus of absorption type including a boiler, a generator, an absorber, an evaporator, a second absorber, means for conducting a solvent from the boiler to the generator, means for conducting solvent from the generator to the absorber, means for conducting strong solution of refrigerant and solvent from the absorber to the generator and means for conducting strong solution of refrigerant and solvent from the absorber to the second absorber, means for conducting vapor refrigerant from the generator to the second absorber, means for conducting gaseous refrigerant mixed with neutral gas from the evaporator to the absorber, means for conducting neutral gas from the absorber to the evaporator, means for conducting from the boiler to the evaporator a medium in which the solvent is soluble but the refrigerant is relatively non-soluble, and means for conducting solvent dissolved in the medium from the evaporator to the boiler.

10. In a refrigeration process which includes the steps of condensing a refrigerant under a pressure subject to variation and then evaporating it into an inert gas, additional steps of expelling solvent from a solution containing a solute of higher boiling point than said solvent, with the aid of the expelled solvent varying the pressure of the inert gas in the same sense as the pressure of condensation varies and with the aid of the same solvent expelling refrigerant from a second solution containing refrigerant and said solvent.

11. In a refrigeration process which includes the steps of absorbing a refrigerant under a pressure subject to variation and then evaporating it in presence of an inert gas, additional steps of expelling a solvent from a solution containing a solute of higher boiling point than said solvent, with the aid of the expelled solvent varying the pressure of the inert gas in the same sense as the pressure of absorption varies and with the aid of the same solvent expelling refrigerant from a second solution containing refrigerant and said solvent.

ABRAM KATZOW.

REFERENCES CITED

The following references are of record in the file of this patent:

UNITED STATES PATENTS

| Number | Name | Date |
| --- | --- | --- |
| 521,401 | Charlton et al. | June 12, 1894 |
| 1,757,254 | Lenning | May 6, 1930 |
| 1,758,099 | Anderson et al. | May 13, 1930 |
| 1,894,359 | Nesselmann et al. | Jan. 17, 1933 |
| 1,897,223 | Altenkirch | Feb. 14, 1933 |
| 1,976,593 | Altenkirch | Oct. 9, 1934 |
| 2,019,290 | Brace | Oct. 29, 1935 |
| 2,052,580 | Randel | Sept. 1, 1936 |

FOREIGN PATENTS

| Number | Country | Date |
| --- | --- | --- |
| 238,233 | Great Britain | Jan. 28, 1927 |